United States Patent [19]

Hseu et al.

[11] Patent Number: 5,184,457
[45] Date of Patent: Feb. 9, 1993

[54] VALVE ASSEMBLY AND METHOD

[75] Inventors: Bill Hseu, Laguna Niguel; Jim Jessee, Northridge; William Wang, Marina Del Ray, all of Calif.

[73] Assignee: Eaton Corporation, Cleveland, Ohio

[21] Appl. No.: 683,873

[22] Filed: Apr. 11, 1991

[51] Int. Cl.$^5$ .............................................. F02C 7/26
[52] U.S. Cl. ................................... 60/39.141; 60/734
[58] Field of Search ............... 60/734, 740, 39.27, 60/39.141, 247, 249, 39.8; 417/380, 381

[56] References Cited

U.S. PATENT DOCUMENTS

| | | | |
|---|---|---|---|
| 2,683,963 | 7/1954 | Chandler | 60/259 |
| 2,939,278 | 6/1960 | Fox | 60/39.8 |
| 3,052,094 | 9/1962 | Osburn | 60/247 |
| 3,232,049 | 2/1966 | Rhodes | 60/39.27 |
| 3,611,717 | 10/1971 | Tissier | 60/39.141 |
| 3,662,545 | 5/1972 | Davis | 60/39.141 |
| 4,306,680 | 12/1981 | Smith | 417/380 |
| 4,385,489 | 5/1983 | Abbott | 60/39.8 |
| 4,464,895 | 8/1984 | Morrison et al. | 60/39.141 |
| 4,597,259 | 7/1986 | Moore et al. | 60/39.141 |
| 5,020,315 | 6/1991 | Leachman, Jr. et al. | 60/734 |

FOREIGN PATENT DOCUMENTS

| | | | |
|---|---|---|---|
| 0954584 | 9/1982 | U.S.S.R. | 60/734 |
| 2086482 | 5/1982 | United Kingdom | 60/734 |

*Primary Examiner*—Richard A. Bertsch
*Assistant Examiner*—Michael I. Kocharou
*Attorney, Agent, or Firm*—Tarolli, Sundheim & Covell

[57] ABSTRACT

A valve assembly is used to start an engine with a minimum of electrical power. The valve assembly provides a low initial fuel flow rate to the engine. Upon initiation of combustion in an engine combustion chamber, the resulting increase in fluid pressure is transmitted through the flow of fuel to the valve assembly. The pressure transmitted from the combustion chamber is effective to actuate the valve assembly to increase the rate of flow of fuel to the engine. The valve assembly includes an inlet valve which is opened to enable fuel to flow at a relatively low rate through an initial flow control orifice to the engine combustion chamber. Upon initiation of burning of fuel, the increase in pressure is transmitted to the valve assembly and is effective to move a main valve member to open a variable size main flow control orifice. Opening of the variable size main flow control orifice increases the rate of flow of fuel to the combustion chamber.

21 Claims, 3 Drawing Sheets

VALVE ASSEMBLY AND METHOD

BACKGROUND OF THE INVENTION

The present invention relates to an improved valve assembly and method for starting an engine with a minimal amount of electrical power.

Auxiliary power units are commonly utilized in conjunction with aircraft engines to drive various equipment, including generators to supply auxiliary power. These auxiliary power units may include a turbine engine which is operated on fuel which is a mixture of gaseous oxygen and a liquid hydrocarbon fuel, such as JP-4 or the equivalent. It is relatively difficult to start the engine in an auxiliary power unit when the ambient temperature is very cold, for example −56° F. At very low temperatures, a battery which is normally used in the starting of the engine in the auxiliary power unit is almost powerless. Therefore, alternative sources of power, such as batteries which are maintained in a heated environment, must be used in conjunction with the starting of the auxiliary power unit.

SUMMARY OF THE INVENTION

The present invention provides a valve assembly and method for starting an engine with a minimal amount of electrical power. The valve assembly provides a flow of fuel to a combustion chamber in the engine at a relatively low initial flow rate. Once combustion has been established in the engine, the valve assembly is actuated by fluid pressure induced in the flow of fuel to the engine to increase the rate of flow of fuel.

The valve assembly includes an initial flow control orifice which is disposed in a valve housing. Fuel can flow through the initial flow control orifice to the engine combustion chamber prior to initiation of burning of fuel in the combustion chamber. A movable main valve member at least partially defines a variable size main flow control orifice through which fuel can also flow to the engine combustion chamber. A biasing spring urges the main valve member toward a closed condition in which fuel can only flow at a low flow rate through the initial flow control orifice to the engine combustion chamber.

Upon initiation of burning of fuel in the engine combustion chamber, the resulting increase in pressure is transmitted through the flow of fuel to a main chamber in the valve assembly. The increased pressure in the main chamber is effective to move the main valve member toward an open condition. When this occurs, the main flow control orifice is opened to increase the rate of flow of fuel to the engine.

Accordingly, it is an object of this invention to provide a new and improved valve assembly and method for use in starting an engine with a minimal amount of electrical power and wherein the valve assembly is actuated under the influence of pressure transmitted through a flow of fuel to the engine.

BRIEF DESCRIPTION OF THE DRAWINGS

The foregoing and other objects and features of the present invention will become more apparent upon a consideration of the following description taken in connection with the accompanying drawings, wherein.

DESCRIPTION OF ONE SPECIFIC PREFERRED EMBODIMENT OF THE INVENTION

General Description

Figure 1:
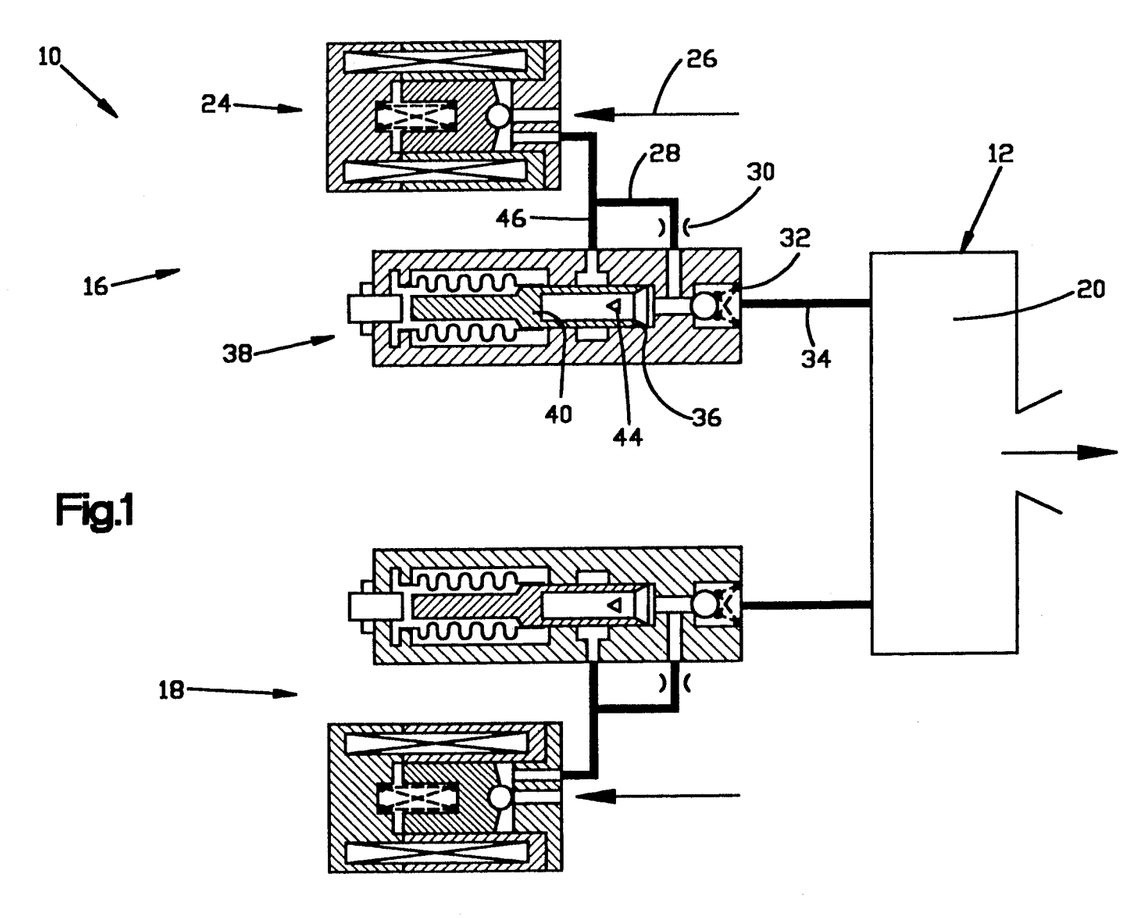
FIG. 1 is a schematic illustration of a fuel flow control system having a pair of valve assemblies which are constructed and operated in accordance with the present invention to control fuel flow to an engine combustion chamber.

A fuel flow control system 10 constructed in accordance with the present invention is illustrated schematically in FIG. 1 in association with a turbine engine 12. Although the engine 12 could be used in man different ways, the engine is associated with an auxiliary power unit for an aircraft. The fuel flow control system 10 is effective to start the engine 12 with a minimal amount of electrical power. It is believed that this will be particularly advantageous when the engine 12 is to be started under particularly cold operating conditions, for example, when the engine is to be started at temperatures around −65° F. At these relatively low temperatures, a battery which is normally used to supply power to start the engine 12, is almost powerless.

The fuel flow control system 10 includes a pair of fuel flow control valve assemblies 16 and 18. The fuel flow control valve assembly 16 controls the flow of a liquid hydrocarbon fuel, such as JP-4, to a combustion chamber 20 of the turbine engine 12. The fuel flow control valve assembly 18 controls a flow of gaseous oxygen to the engine combustion chamber 20. The fuel flow control valve assemblies 16 and 18 control the flow of fuel during starting and initial operation of the engine 12 until conventional fuel flow controls (not shown) can be used to supply fuel to the engine.

The fuel flow control valve assemblies 16 and 18 are substantially identical in their construction and mode of operation. However, the seals, valve seats and other individual components of the fuel flow control valve assemblies 16 and 18 are formed of materials which are compatible with the particular fuel to be conducted through the valve assemblies. Thus, the components of the fuel flow control valve assembly 16 are formed of components which are compatible with liquid hydrocarbon fuels. The components of the fuel flow control valve assembly 18 are formed of components which are compatible with gaseous oxygen.

The fuel flow control valve assembly 16 requires a minimal amount of electrical power to establish a low initial fuel flow rate to the engine 12 to enable combustion to be established in the combustion chamber 20 of the engine. Upon initiation of burning of fuel in the combustion chamber 20, the valve assembly 16 responds to the increase in fluid pressure, generated in the combustion chamber by the burning of fuel, to increase the rate of flow of fuel to the combustion chamber. Increasing the rate of flow of fuel to the combustion chamber 20 increases the initial rate of combustion to a rate which can be maintained as the components of the engine 12 warm up. When the process of combustion has been fully established in the engine 12 and the components of the engine have been warmed, the fuel flow control valve assembly 16 is closed and fuel is supplied to the combustion chamber 20 by conventional fuel flow controls (not shown) which are used during normal operation of the engine.

When the turbine engine 12 is to be started, an inlet fuel flow control valve assembly 24 (FIG. 1) is actuated to an open condition. This enables fuel to flow from a source of fuel under pressure into the valve assembly 24, in the manner indicated schematically by the arrow 26. The fuel flows from the inlet fuel flow control valve assembly 24 through an initial fuel flow passage 28 to an initial fuel flow control orifice 30. A relatively low initial rate of fuel flow is established from the orifice 30 through a check valve assembly 32 and conduit 34 to the combustion chamber 20 of the turbine engine 12.

Upon ignition of the fuel in the combustion chamber 20, the fluid pressure in the combustion chamber increases. The increased fluid pressure generated by burning of the fuel is transmitted through the fuel in the conduit 34 to a main chamber 36 in the main fuel flow control valve assembly 38.

The increase in fluid pressure in the main chamber 36 moves a main valve member 40 toward the left (as viewed in FIG. 1) to actuate a variable size main flow control orifice 44 to an open condition. This enables fuel to flow through a main fuel flow passage 46 to the main chamber 36. The fuel flows from the main chamber 36 through the check valve 32 and conduit 34 to the engine combustion chamber 20.

Due to the increased rate of fuel flow through the variable size main flow control orifice 44 to the engine combustion chamber 20, the rate of burning of fuel in the combustion chamber increases with a resulting increase in the fluid pressure in the combustion chamber. The increase in fluid pressure in the combustion chamber 20 is transmitted back through the flow of fuel to the main chamber 36. The increased pressure in the main chamber 36 is applied against and effects movement of the main valve member 40 to increase the size of the main flow control orifice 44 to further increase the rate of flow of fuel to the combustion chamber 20.

The check valve assembly 32 blocks any sudden surges in the pressure in the combustion chamber from being transmitted to the main chamber 36 of the main fuel flow control valve assembly 38. However, the slower rise in pressure in the combustion chamber 20 due to normal burning of fuel, is not effective to close the check valve assembly 32. Thus, the check valve assembly 32 is effective to protect the main fuel flow control valve assembly 38 from the effect of sudden pressure surges in the combustion chamber 20 while transmitting normal increases in fluid pressure resulting from the normal burning of fuel in the combustion chamber 20.

When burning of the fuel conducted from the fuel flow control valve assembly 16 has been fully established in the combustion chamber 20, the turbine engine 12 will be operating at a relatively low speed. Once this low speed operation of the turbine engine 12 has been fully established, the inlet fuel flow control valve assembly 24 is operated to a closed condition blocking a flow of fuel to the main fuel flow control valve assembly 38. This interrupts the flow of fuel through the conduit 34 to the combustion chamber 20. However, as this occurs, conventional fuel flow controls (not shown) connected with the turbine engine 12 take over and provide for the continued flow of fuel to the engine.

It should be understood that the fuel flow control valve assembly 18 for the gaseous oxygen fuel has the same general construction and mode of operation as the fuel flow control valve assembly 16 for the liquid hydrocarbon fuel. During the establishment of burning of fuel in the combustion chamber 20, liquid hydrocarbon fuel is conducted through the fuel flow control valve assembly 16 to the combustion chamber and gaseous oxygen is conducted through the fuel flow control valve assembly 18 to the combustion chamber 20. When the conventional fuel flow controls take over the supplying fuel to the engine 12, the fuel flow control valve assembly 18 is operated to a closed condition blocking the flow of gaseous oxygen to the combustion chamber 20 in the same manner as in which the fuel flow control valve assembly 16 is closed to block the flow of liquid hydrocarbon fuel to the combustion chamber.

Fuel Flow Control Valve Assembly

Figure 2:
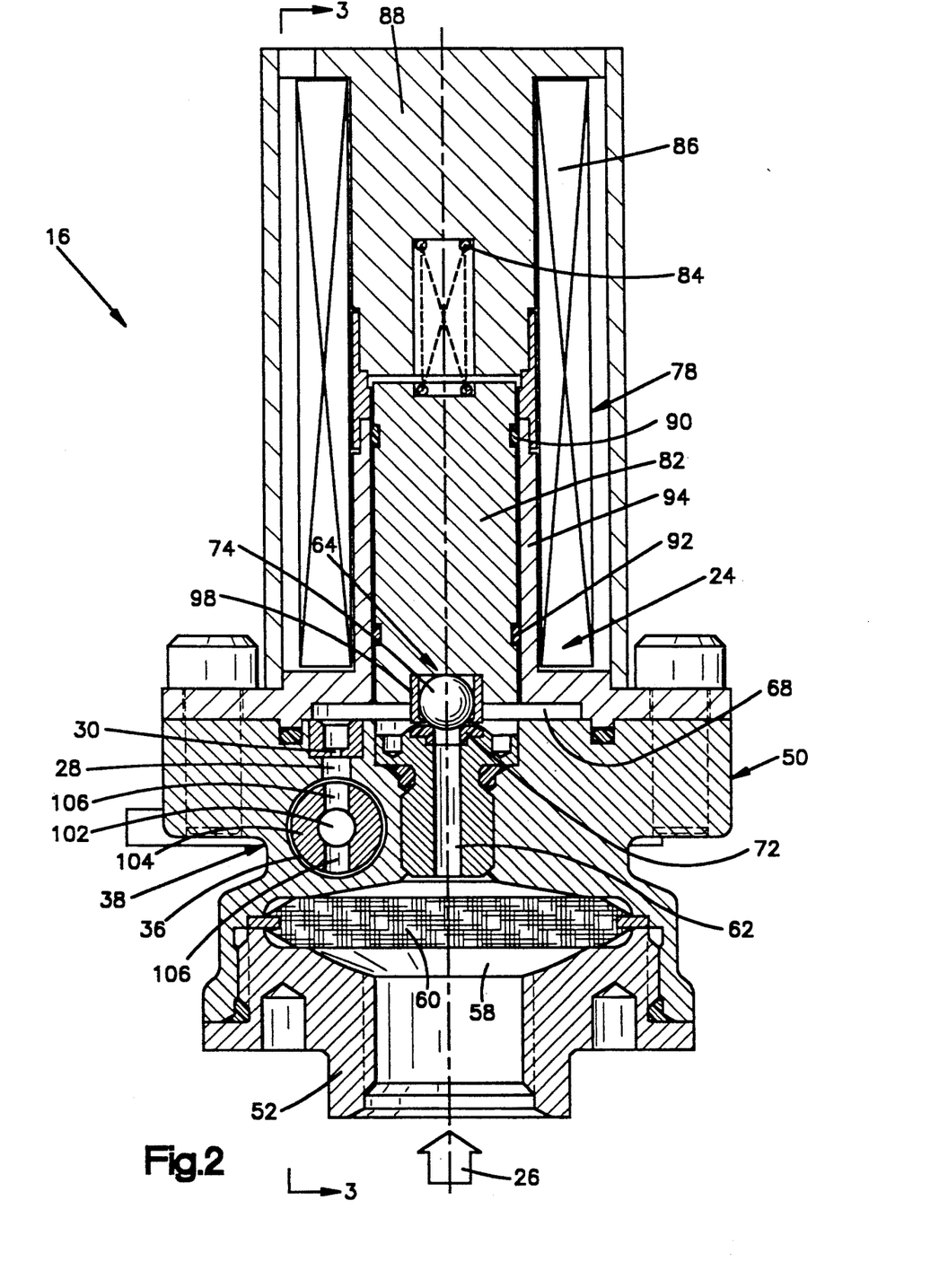
FIG. 2 is an enlarged sectional view of a portion of one of the valve assemblies of FIG. 1 and illustrating the manner in which an inlet flow control valve assembly blocks fuel flow into a inlet chamber prior to initiation of an engine starting operation.
Figure 3:
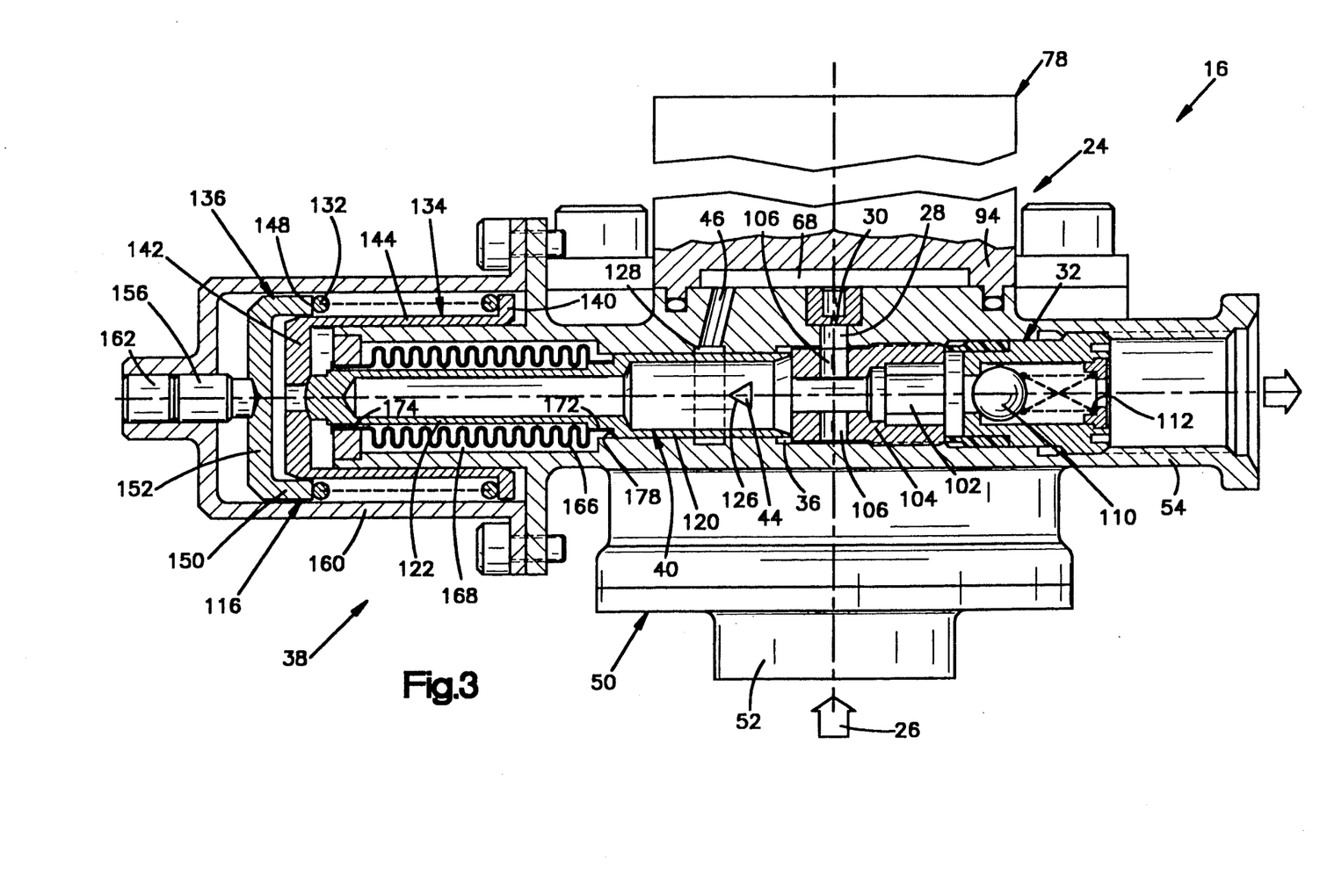
FIG. 3 is a partially broken away sectional view, taken generally along the line 3—3 of FIG. 2, illustrating the relationship of an initial flow control orifice and main valve member to a main chamber through which fuel flows to the engine combustion chamber.

In the embodiment of the invention illustrated in FIGS. 2 and 3, the inlet fuel flow control valve assembly 24 and the main fuel flow control valve assembly 38 are contained in a single housing 50. The housing 50 has an inlet connector section 52 which is connected with a source of fuel under pressure. The source of fuel under pressure may be a tank or reservoir which is pressurized by an accumulator. The housing 50 also has an outlet connector section 54 (FIG. 3) which is connected with the conduit 34 (FIG. 1) which conducts a flow of fuel to the engine combustion chamber 20.

The fuel entering the housing 50 (FIG. 2) through the inlet connector section 52, flows into a circular filter chamber 58 in which a filter 60 is disposed. The fuel flows through the filter 60 into an inlet passage 62. An inlet valve 64 is operable between a closed condition blocking fluid flow through the inlet passage 62 and an open condition enabling fluid to flow from the passage 62 into a circular inlet chamber 68.

The inlet valve 64 includes an annular valve seat 72 which extends around an outlet from the passage 62. A spherical ball valve 74 engages the valve seat 72 to block fluid flow through the passage 62. However, the valve 74 is movable away from the seat 72 to enable fuel to flow from the passage 62 to the inlet chamber 68.

The valve 74 is normally held in the closed position shown in FIG. 2 by an inlet valve actuator assembly 78. The inlet valve actuator assembly 78 includes a cylindrical metal armature 82. The armature 82 is normally pressed against the inlet valve 74 by a helical biasing spring 84 to hold the inlet valve firmly against the valve seat 72. Of course, this blocks fluid flow through the inlet passage 62.

To actuate the inlet valve 64 to the open condition, a cylindrical coil 86 is energized. A magnetic field provided by a cylindrical metal pole piece 88 attracts the armature 82 to move the armature upwardly against the influence of the biasing spring 84. A pair of annular glide rings 90 and 92 move along the inside of a stationary cylindrical armature housing 94 to guide movement of the armature 82.

Energization of the coil 86 requires minimal electrical energy. Thus, the coil 86 can be energized to attract the armature 82 with approximately 2-5 watts of electrical energy. As the armature 82 moves upwardly toward the pole piece 88, an annular inlet valve retainer 98 pulls the inlet valve 74 upwardly and holds the inlet valve against sideways movement.

Fuel flows through the open inlet valve 64 to a central portion of the circular and generally disk-shaped inlet chamber 68. The fuel flows radially outwardly from the central portion of the inlet chamber 68 to the initial fuel flow passage 28 in which the orifice 30 is disposed (FIG. 2). The fuel also flows radially outwardly from the central portion of the inlet chamber 68 to the main fuel flow passage 46 (FIG. 3). Prior to starting of the turbine engine 12, the main fuel flow control valve assembly 38 is in the closed condition of FIG. 3 blocking the flow of fuel through the main fuel flow passage 46.

When the engine 12 is to be started, the inlet valve 64 (FIG. 2) is actuated to the open condition by energizing the coil 86 with a negligible amount of electrical power. This enables fuel to flow from the inlet chamber 68 through the orifice 30 in the initial fuel flow passage 28 to the main chamber 36. This initial flow of fuel enters a cylindrical cavity 102 in a hollow sleeve or insert 104 through radially extending passages 106. The insert 104 is disposed in the main chamber 36.

The fuel flows from the cavity 102 in the cylindrical insert 104 (FIG. 3) to the check valve assembly 32. The fluid pressure applied by the fuel against a spherical ball valve 110 in the check valve assembly 32 moves the ball valve against the influence of a biasing spring 112 to open the check valve assembly. This enables the fuel to flow through the check valve assembly 32 and outlet connector section 54 to the conduit 34 (FIG. 1) which conducts the fuel to the engine combustion chamber 20. The check valve assembly 32 is disposed in a coaxial relationship with the generally cylindrical main chamber 36 and outlet connector section 54.

Since the inlet valve 64 (FIG. 2) remains open, there is a constant flow of fuel at a relatively low or restricted rate, determined by the size of the orifice 30, through the check valve assembly 32 (FIG. 3) to the conduit 34 (FIG. 1) and the combustion chamber 20 of the engine 12. Upon ignition of the fuel in the combustion chamber 20, the fluid pressure in the combustion chamber increases. The increased fluid pressure generated by the burning of fuel in the combustion chamber 20 is transmitted through the fuel in the conduit 34 to the main chamber 36 (FIG. 3) of the main fuel flow control valve assembly 38.

The increased fluid pressure in the main chamber 36 of the main fuel flow control valve assembly 38 moves the main valve member 40, against the influence of a biasing spring assembly 116, to open the variable size main flow control orifice 44. The main valve member 40 functions as a piston having a hollow cylindrical head section 120 which is disposed in a coaxial relationship with a hollow cylindrical rod section 122 and the main chamber 36. The open end of the hollow head section 120, that is the right end as viewed in FIG. 3, is open to the main chamber 36. Therefore, the initial flow of fuel through the flow control orifice 30 is effective to fill the interior of the hollow main valve member 40 with fuel. The fluid pressure transmitted from the engine combustion chamber 20 through the fuel to the main chamber 36 is conducted into the hollow main valve member 40.

As the fluid pressure in the main chamber 36 increases, the main valve member 40 is moved toward the left (as viewed in FIG. 3) against the influence of the biasing spring assembly 116. This leftward movement of the main valve member 40 moves a triangular-shaped opening 126 in the side wall of the head section 120 of the main valve member 40 toward an annular groove 128 which extends around the head section 120 of the main valve member 40. The annular groove 128 cooperates with the triangular-shaped opening 126 in the side wall of the main valve member 40 to form the variable size main flow control orifice 44. If desired, the opening for the initial flow control orifice 30 could be formed in the side wall of the main valve member 40.

The biasing spring assembly 116 normally urges the main valve member 40 to the closed position shown in FIG. 3. When the main valve member 40 is in the closed position, the triangular-shaped opening 126 in the side wall of the main valve member 40 is offset from the annular groove 128. Therefore, fluid flow through the main flow control orifice 44 is blocked. However, as the fluid pressure generated by burning of fuel in the combustion chamber 20 is transmitted back to the main chamber 36, the main valve member 40 is moved against the influence of the biasing spring to open the variable size main flow control orifice 44.

The greater the rate of burning of fuel in the engine combustion chamber 20, the greater is the fluid pressure conducted back to the main chamber 36. The greater the fluid pressure in the main chamber 36, the further the main valve member 40 moves from the closed position against the influence of the main biasing spring assembly 116. The further the main valve member 40 moves from the closed position, the greater will be the extent of overlap of the triangular-shaped opening 126 in the side wall of the valve member and the annular groove 128 and the greater will be the effective size of the main flow control orifice 44.

The biasing spring assembly 116 (FIG. 3) urges the main valve member 40 toward the closed position. The biasing spring assembly 116 is disposed in a coaxial relationship with the main valve member 40. The biasing spring assembly 116 includes a helical spring 132 which is held between an inner spring retainer 134 and an outer spring retainer 136. The inner and outer spring retainers 134 and 136 are disposed in a coaxial relationship with the main valve member 40.

The inner spring retainer 134 includes an annular rim portion 140 which is engaged by and is coaxial with one end, that is the right end as viewed in FIG. 3, of the helical spring 132. The inner spring retainer 134 has a circular end wall 142 which is connected with the annular rim 140 by a cylindrical side wall 144. The circular end wall 142 of the inner spring retainer 134 abuts an end of the main valve member 40.

The outer spring retainer 136 has an annular end surface 148 which abuts and is coaxial with the left (as viewed in FIG. 3) end of the helical biasing spring 132. The annular end surface 148 is formed on a cylindrical side wall 150 of the outer spring retainer 136. A circular end wall 152 is connected with the side wall 150. The end wall 152 is coaxial with and is disposed in abutting engagement with an adjusting screw 156 disposed in an internally threaded opening formed at one end of a cylindrical cover 160. A set screw 162 abuts the adjusting screw 156 to maintain the adjusting screw in its desired position.

Adjusting the screw 156 enables the stroke of the main valve member 40 to be adjusted. Thus, when the main valve member 40 is in the closed position of FIG. 3, the coaxial circular end walls 142 and 152 of the inner and outer spring retainers 134 and 136 are spaced apart by a distance corresponding to the maximum stroke of the main valve member 40. When the main valve member 40 is in its fully open position, that is when the size of the main flow control orifice 44 is a maximum, the end wall 142 of the inner spring retainer 134 is disposed in abutting engagement with the end wall 152 of the outer spring retainer 136. By turning the adjusting screw 156, the distance between the end walls 142 and 152 of the inner and outer spring retainers 134 and 136 can be varied to adjust the stroke of the main valve member 40.

A generally cylindrical bellows 166 is connected between the housing 50 and the main valve member 40. The bellows 166 cooperates with the housing 50 to form a cylindrical annular chamber 168 around the outside of the bellows 166. The chamber 168 is coaxial with the main valve member 40 and receives fuel which leaks between the housing 50 and the main valve member.

A circular inner or right end portion 172 of the bellows 166 is fixedly connected with the main valve member 40 by welding or other means. Similarly, a circular outer or left end portion 174 of the bellows 166 is fixedly connected to the housing 50. Due to fluid tight connections between the end portions 172 and 174 of the bellows 166 with the main valve member 40 and housing 50, fuel cannot leak out of the chamber 168 around the outside of the bellows. It is believed that the use of the bellows 166 to prevent the leakage of fuel will be particularly important when the fuel is gaseous oxygen.

The bellows 166 is sized to have an effective diameter which is the same as the outer diameter of the head section 120 of the main valve member 40. This results in a balancing of the fluid pressure forces applied by the fuel in the chamber 168 on the outside of the main valve member 40. Thus, the leftward fluid pressure force applied by the fuel against the bellows 166 is equal to the rightward force applied by the fuel against an annular end surface 178 (FIG. 3) formed on the main valve member 40. In addition to providing a fluid tight seal and balancing fluid pressure forces, the bellows 166 assists the spring 132 in biasing the main valve member 40 toward the closed position of FIG. 3.

Although only the construction of the fuel flow control valve assembly 16 for the liquid hydrocarbon fuel, such as JP-4, has been described in conjunction with FIGS. 2 and 3, it should be understood that the fuel flow control valve assembly 18 (FIG. 1) has the same construction and mode of operation as the fuel flow control valve assembly 16. The fuel flow control valve assembly 16 is utilized to control the flow of liquid hydrocarbon fuel while the flow control valve assembly 18 is utilized to control the flow of gaseous oxygen. However, it is contemplated that the fuel flow control valve assemblies 16 and 18 could be utilized to control the flow of any desired fuels to the engine combustion chamber 20 during starting of the engine 12.

Operation

When the engine 12 is to be started, the coil 86 (FIG. 2) of the inlet valve actuator assembly 78 is energized with a minimum amount of electrical power, that is, approximately 2–5 watts. Upon energization of the coil 86, the armature 82 is moved upwardly (as viewed in FIG. 2) to move the inlet valve or ball 74 away from the valve seat 72. This allows an initial flow of fuel, indicated by the arrow 26 in FIG. 2, to flow through the filter 60 into the inlet chamber 68.

Fuel flows from the inlet chamber 68 through the initial fuel flow passage 28 and initial fuel flow control orifice 30 to the main chamber 36 of the main fuel flow control valve assembly 38 (FIGS. 2 and 3). The fuel flows from the main chamber 36 through the check valve assembly 32 (FIG. 3) and outlet connector section 54 to the conduit 34 (FIG. 1 which is connected with the engine combustion chamber 20. The fuel in the engine combustion chamber 20 is ignited.

Upon igniting of the fuel in the engine combustion chamber 20, the fluid pressure in the engine combustion chamber is increased. If there should be a sudden detonation of fuel in the combustion chamber 20 upon ignition of the fuel, the check valve assembly 32 (FIG. 3) blocks the resulting sudden surge of pressure from entering the main valve chamber 36. However, in the absence of a sudden surge in the fluid pressure conducted from the combustion chamber 20, the check valve assembly 32 remains open under the influence of the fluid pressure exerted against the valve 110 by the initial flow of fuel to the combustion chamber.

The increased fluid pressure, due to normal burning of fuel in the combustion chamber 20, is transmitted through the fuel in the conduit 34 and check valve assembly 32 back to the main valve chamber 36. The resulting increase in the fluid pressure in the main valve chamber 36 is applied against the end of the main valve member 40. This fluid pressure moves the main valve member 40 and inner spring retainer 134 toward the left (as viewed in FIG. 3) against the influence of the biasing spring 132. As the main valve member 40 moves leftwardly, the opening 126 in the side wall of the main valve member 40 overlaps the annular groove 128 in the housing 50. As this occurs, the main flow control orifice 44 begins to open.

Opening of the main fuel flow control orifice 44 enables the fuel to flow from the inlet chamber 68 through the main fuel flow passage 46 to the annular groove 128 in the main valve chamber 36. The fuel can then flow through the partially open main flow control orifice 44. The fuel flows through the main chamber 36, the check valve assembly 32 and conduit 34 to the engine combustion chamber 20. Thus, the fuel which flows through the open, but relatively small, main flow control orifice 44 will add to the continuing fuel flow through the initial flow control orifice 30. This increases the total rate of fuel flow to the engine combustion chamber 20.

Increasing the total rate of fuel flow t the engine combustion chamber 20 results in an increase in the fluid pressure generated in the engine combustion chamber 20 by the burning of fuel. The increased fluid pressure is transmitted through the fuel in the conduit 34 to the main chamber 36. The increased fluid pressure in the main chamber 36 results in the main valve member 40 being moved toward the left (as viewed in FIG. 3) against the influence of the biasing spring 132. Of course, the leftward movement of the main valve member 40 increases the size of the main flow control orifice 44 to effect an increase in the rate of flow of fuel to the engine combustion chamber 20. This results in an increased rate of burning of fuel in the combustion chamber 20 with a resulting increase in the fluid pressure in the main chamber 36.

When a predetermined rate of combustion has been obtained in the engine combustion chamber 20, the fluid pressure in the main chamber 36 will have been sufficient to move the main valve member 40 leftwardly to its end of stroke position. At this time, the end wall 142 of the inner spring retainer 134 is disposed in abutting engagement with the end wall 152 of the outer spring retainer 136. The main flow control orifice 44 has obtained a maximum size and the rate of flow of fuel to the engine combustion chamber 20 through the main fuel flow control valve assembly 38 is a maximum.

After the burning of fuel in the engine combustion chamber 20 has stabilized, the conventional controls for the flow of fuel to the engine combustion chamber 20 are activated and the inlet valve 64 (FIG. 2) is closed. Thus, the coil 86 is de-energized and the biasing spring 84 moves the armature 82 downwardly to press the valve member 74 against the valve seat 72. Once the inlet valve 64 has been closed, the flow of fuel to the engine combustion chamber 20 through the main flow control valve assembly 38 is blocked. The fuel flow control system 10 will remain in an inactive condition until the next subsequent starting operation of the engine 12 is to be undertaken.

Conclusion

In view of the foregoing description, it is apparent that the present invention provides a new and improved fuel flow control system 10 for use in starting an engine 12 with a minimal amount of electrical power. The fuel flow control system 10 includes a pair of fuel flow control valve assemblies 16 and 18. Each of the fuel flow control valve assemblies 16 and 18 provides a flow of fuel to a combustion chamber 20 in the engine 12 at a relatively low initial flow rate. Once combustion has been established in the engine 12, the fuel flow control valve assemblies 16 and 18 are actuated under the influence of fluid pressure induced in the flows of fuel to the engine 12, as a result of the combustion of the fuel in the combustion chamber 20, to increase the rate of flow of fuel to the engine.

The fuel flow control valve assemblies 16 and 18 each include an initial flow control orifice 30 which is disposed in a valve housing 50. Fuel ca flow through the initial flow control orifices 30 and main chambers 36 of the flow control valve assemblies 16 and 18 to the engine combustion chamber 20 prior to initiation of burning of fuel in the combustion chamber. Movable main valve members 40 partially define variable size main flow control orifices 44 through which fuel can also flow to the engine combustion chamber 20. Biasing springs 132 urge the main valve members 40 toward closed conditions in which fuel can only flow at a low flow rate through the initial flow control orifices 30 to the engine combustion chamber 20.

Upon initiation of burning of fuel in the engine combustion chamber 20, the resulting increase in fluid pressure is transmitted through the flows of fuel to the main chambers 36 in the fuel flow control valve assemblies 16 and 18. The increased pressures in the main chambers 36 of the fuel flow control valve assemblies 16 and 18 are effective to move the main valve members 40 toward open conditions. When this occurs, the main flow control orifices 44 are opened to increase the rate of flow of fuel to the engine 12.

Having described the invention, the following is claimed:

1. A valve assembly for use in starting an engine with a minimal amount of electrical power, said valve assembly comprising first means for establishing a flow of fuel to the engine at a first flow rate to enable continuous combustion to be established in the engine, and second means operable under the influence of fluid pressure induced in the flow of fuel to the engine by the combustion of fuel in the engine to increase the rate of flow of fuel to the engine from the first rate to a rate which is greater than the first rate.

2. A valve assembly as set forth in claim 1 wherein said first means includes an orifice for limiting the rate of flow of fuel to the engine to the first fuel flow rate.

3. A valve assembly as set forth in claim 1 wherein said first means includes check valve means for blocking excessive back pressure surges in the flow of fuel to the engine.

4. A valve assembly as set forth in claim 1 further including flow control valve means operable between a closed condition blocking a flow of fuel to said first and second means and an open condition enabling fuel to flow to said first and second means.

5. A valve assembly for use in starting an engine with a minimal amount of electrical power, said valve assembly comprising a housing, said housing including surface means for defining a main chamber disposed in said housing, initial flow control orifice means disposed in said housing and connected in fluid communication with the main chamber prior to initiation of combustion in a combustion chamber of the engine, a movable valve member disposed in said housing, said valve member having an end portion exposed to the fluid pressure in the main chamber in said housing, said valve member having movable valve surface means which cooperates with fixed valve surface means connected with said housing to form a variable size main flow control orifice means through which fuel can flow to the main chamber, and spring means for urging said valve member to a closed condition in which fuel can flow at an initial low flow rate through said initial flow control orifice means to the main chamber, said valve member being movable relative to said housing against the influence of said spring means to an open condition in which fuel can flow at a second flow rate through said main flow control orifice means to the main chamber, said second flow rate being greater than said first flow rate, said valve member being movable relative to said housing under the influence of fluid pressure in the main chamber and against the influence of said spring means to vary the size of said main flow control orifice as a function of variations in the fluid pressure in the main chamber, said housing including means adapted to be connected with a conduit through which fuel can flow from the main chamber in said housing to the combustion chamber in the engine and through which fluid pressure is conducted from the combustion chamber in the engine to the main chamber in said housing to effect an increase in the fluid pressure in the main chamber in said housing from a relatively low initial pressure to an increased pressure which is conducted from the combustion chamber of the engine and transmitted through the fuel to the main chamber in said housing upon initiation of combustion of fuel in the combustion chamber of the engine.

6. A valve assembly as set forth in claim 5 further including check valve means disposed in said housing for blocking sudden surges in pressure transmitted through the fuel to the main chamber in said housing.

7. A valve assembly as set forth in claim 5 wherein said housing includes surface means for at least partially defining an inlet chamber, means for connecting said inlet chamber in fluid communication with a source of fuel, first passage means for connecting said inlet chamber in fluid communication with said initial flow control orifice means and a second passage means for connecting said inlet chamber in fluid communication with said main flow control orifice means, said inlet chamber being connected in fluid communication with the main chamber through said first and second passage means when said valve member is in the open condition.

8. A valve assembly as set forth in claim 7 further including inlet valve means disposed in said housing and operable between a closed condition blocking fuel flow into the inlet chamber and an open condition enabling fluid to flow into the inlet chamber.

9. A valve assembly as set forth in claim 1 wherein the engine is associated with an auxiliary power unit for an aircraft to supply power during starting of the aircraft.

10. A valve assembly for use in starting an engine with a minimal amount of electrical power, said valve assembly comprising first means for establishing a flow of fuel to the engine at a first flow rate to enable combustion to be established in the engine, and second means operable under the influence of fluid pressure induced in the flow of fuel to the engine by the combustion of fuel in the engine to increase the rate of flow of fuel to the engine from the first rate to a rate which is greater than the first rate, said second means including a valve member which is movable between a closed condition blocking fuel flow to the engine and an open condition enabling fuel to flow to the engine, biasing means for urging said valve member toward the closed condition, and means for holding at least a portion of a body of fuel which engages the valve member and is exposed to fluid pressure which is generated by the combustion of fuel in the engine, said valve member being movable from the closed condition to the open condition against the influence of said biasing means under the influence of fluid pressure conducted through the body of fuel.

11. A vale assembly as set forth in claim 10 wherein said first means includes check valve means for blocking excessive back pressure surges in the flow of fuel to the engine.

12. A valve assembly as set forth in claim 10 further including flow control valve means operable between a closed condition blocking a flow of fuel to said first and second means and an open condition enabling fuel to flow to said first and second means.

13. A valve assembly as set forth in claim 10 wherein the engine is associated with an auxiliary power unit for an aircraft to supply power during starting of the aircraft.

14. A valve assembly for use in starting an engine with a minimal amount of electrical power, said valve assembly comprising first means for establishing a flow of fuel to the engine at a first flow rate to enable combustion to be established in the engine, and second means operable under the influence of fluid pressure induced in the flow of fuel to the engine by the combustion of fuel in the engine to increase the rate of flow of fuel to the engine from the first rate to a rate which is greater than the first rate, said second means including a valve member having surface means which at least partially defines a variable size orifice, said valve member being movable under the influence of back pressure conducted through the flow of fuel to the engine to vary the size of the orifice as the back pressure varies.

15. A valve assembly as set forth in claim 14 further including flow control valve means operable between a closed condition blocking a flow of fuel to said first and second means and an open condition enabling fuel to flow to said first and second means.

16. A vale assembly as set forth in claim 14 wherein the engine is associated with an auxiliary power unit for an aircraft to supply power during starting of the aircraft.

17. A valve assembly for use in starting an engine with a minimal amount of electrical power, said valve assembly comprising a housing, said housing including surface means for defining a main chamber disposed in said housing, means for enabling fuel to flow at a first rate to the main chamber prior to initiation of combustion in a combustion chamber of the engine, a movable valve member disposed in said housing, said valve member being movable relative to said housing under the influence of fluid pressure in the main chamber to an open condition in which fuel can flow at a second flow rate to the main chamber, said second flow rate being greater than said first flow rate, said housing including means adapted to be connected with a conduit through which fuel can flow from the main chamber in said housing to the combustion chamber in the engine and through which fluid pressure is conducted from the combustion chamber in the engine to the main chamber in said housing to effect an increase in the fluid pressure in the main chamber in said housing from an initial pressure to an increased pressure which is conducted from the combustion chamber of the engine and transmitted through the fuel to the main chamber in said housing upon initiation of combustion of fuel in the combustion chamber of the engine.

18. A valve assembly as set forth in claim 17 further including check valve means disposed in said housing for blocking sudden surges in pressure transmitted through the fuel to the main chamber in said housing.

19. A valve assembly as set forth in claim 17 wherein said housing includes surface means for at least partially defining an inlet chamber, means for connecting said inlet chamber in fluid communication with a source of fuel, said inlet chamber being connected in fluid communication with the main chamber when said valve member is in the open condition.

20. A valve assembly as set forth in claim 19 further including inlet valve means disposed in said housing and operable between a closed condition blocking fuel flow into the inlet chamber and an open condition enabling fluid to flow into the inlet chamber.

21. A valve assembly as set forth in claim 17 wherein the engine is associated with an auxiliary power unit for an aircraft to supply power during starting of the aircraft.

* * * * *

UNITED STATES PATENT AND TRADEMARK OFFICE
CERTIFICATE OF CORRECTION

PATENT NO. : 5,184,457
DATED     : February 9, 1993
INVENTOR(S) : Bill Hseu, Jim Jessee, and William Wang It is certified that error appears in the above-identified patent and that said Letters Patent is hereby corrected as shown below:

```
Column 10, line 21, after "chamber", insert -- for enabling
          fuel to flow at a first rate to the main chamber--.

Column 11, line 36, change "vale" to -- valve --.

Column 12, line 10, change "vale" to -- valve --.
```

Signed and Sealed this

Eleventh Day of January, 1994

Attest:

BRUCE LEHMAN

Attesting Officer

Commissioner of Patents and Trademarks